United States Patent
He et al.

(10) Patent No.: US 10,818,918 B2
(45) Date of Patent: *Oct. 27, 2020

(54) METHOD FOR MAKING CATHODE ACTIVE MATERIAL COATING LIQUID AND METHOD FOR COATING CATHODE ACTIVE MATERIAL

(71) Applicant: Tsinghua University, Beijing (CN)

(72) Inventors: Xiang-Ming He, Beijing (CN); Ying-Qiang Wu, Suzhou (CN); Li Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 56 days.

This patent is subject to a terminal disclaimer.

(21) Appl. No.: 16/143,460

(22) Filed: Sep. 27, 2018

(65) Prior Publication Data

US 2019/0027743 A1    Jan. 24, 2019

Related U.S. Application Data

(63) Continuation of application No. PCT/CN2017/071567, filed on Jan. 18, 2017.

(30) Foreign Application Priority Data

Apr. 8, 2016    (CN) .......................... 2016 1 0216459

(51) Int. Cl.
*H01M 4/36* (2006.01)
*H01M 4/1397* (2010.01)
(Continued)

(52) U.S. Cl.
CPC .............. *H01M 4/366* (2013.01); *H01B 1/00* (2013.01); *H01M 4/0471* (2013.01);
(Continued)

(58) Field of Classification Search
CPC ......... H01M 2004/028; H01M 4/0471; H01M 4/1391; H01M 4/1397; H01M 4/366; H01M 4/505; H01M 4/525; H01B 1/00
See application file for complete search history.

(56) References Cited

U.S. PATENT DOCUMENTS

4,454,193 A * 6/1984 Block ................... C04B 41/009
  427/113
2007/0178370 A1   8/2007 Amine et al.
(Continued)

FOREIGN PATENT DOCUMENTS

CN    102332563     1/2012
CN    102832388     12/2012
(Continued)

OTHER PUBLICATIONS

International Search Report of PCT/CN2017/071567.
(Continued)

*Primary Examiner* — Mark Kopec
*Assistant Examiner* — Jaison P Thomas

(57) ABSTRACT

The present disclosure provides a method for making a cathode active material coating liquid. A phosphate ester solution is formed by adding a phosphate ester in an alcoholic solvent. An aluminum nitrate is introduced in the phosphate ester solution. The aluminum nitrate is soluble to the alcoholic solvent, and reacts with the phosphate ester to form a homogeneous clear solution. A pH value of the homogeneous clear solution is regulated to a range from about 6 to about 7 by adding an acidity regulator. The acidity regulator contains ammonium cation. The ammonium nitrate is removed from the clear solution after regulating the pH value. A method for coating the cathode active material is also provided.

17 Claims, 8 Drawing Sheets

(51) Int. Cl.
*H01M 4/1391* (2010.01)
*H01M 4/04* (2006.01)
*H01B 1/00* (2006.01)
H01M 4/505 (2010.01)
H01M 4/525 (2010.01)
H01M 4/02 (2006.01)

(52) U.S. Cl.
CPC ....... *H01M 4/1391* (2013.01); *H01M 4/1397* (2013.01); *H01M 4/505* (2013.01); *H01M 4/525* (2013.01); *H01M 2004/028* (2013.01)

(56) References Cited

U.S. PATENT DOCUMENTS

2014/0134398 A1* 5/2014 Sambasivan ............ C23C 22/03
428/141
2018/0337401 A1* 11/2018 Ni .......................... C01G 53/42

FOREIGN PATENT DOCUMENTS

| CN | 103490060 | | 1/2014 |
|---|---|---|---|
| CN | 105742605 A | * | 7/2016 |

OTHER PUBLICATIONS

Correlation between AlPO4 nanoparticle coating thickness on LiCoO2 cathode and thermal stablility, J.Cho, Electrochimica Acta 48(2003) 2807-2811.

* cited by examiner

METHOD FOR MAKING CATHODE ACTIVE MATERIAL COATING LIQUID AND METHOD FOR COATING CATHODE ACTIVE MATERIAL

CROSS-REFERENCE TO RELATED APPLICATIONS

This application claims all benefits accruing under 35 U.S.C. § 119 from China Patent Application No. 201610216459.4, filed on Apr. 8, 2016, in the State Intellectual Property Office of China, the content of which is hereby incorporated by reference. This application is a continuation under 35 U.S.C. § 120 of international patent application PCT/CN2017/071567, filed on Jan. 18, 2017, the content of which is also hereby incorporated by reference.

FIELD

The present disclosure relates to methods for making cathode active material coating liquids, and methods for coating cathode active materials.

BACKGROUND

Coating surfaces of cathode active material particles is a common method to modify a cathode active material of a lithium ion battery. For example, a carbon layer can be coated on surfaces of lithium iron phosphate particles to improve the conductivity of lithium iron phosphate. In another example, aluminum phosphate can be coated on surfaces of the cathode active material particles (such as lithium cobalt oxide particles) to improve the thermal stability of a cathode of the lithium ion battery (referring to "Correlation between $AlPO_4$ nanoparticle coating thickness on $LiCoO_2$ cathode and thermal stability." J. Cho, Electrochimica Acta 48 (2003) 2807-2811 and U.S. Pat. No. 7,326,498).

A conventional method to coat the aluminum phosphate on the surface of the cathode active material includes: dispersing aluminum phosphate particles in water to obtain a dispersion liquid, adding the cathode active material particles to the dispersion liquid so that the aluminum phosphate particles are adsorbed on the surfaces of the cathode active material particles due to adsorption effect, removing the water from the dispersion liquid, and heating the resultant solid at about 700° C., thereby obtaining the cathode active material with the aluminum phosphate particles on the surface thereof. However, because the aluminum phosphate is insoluble in water, the aluminum phosphate coating layer formed on the surface of the cathode active material by the above method is not uniform, resulting in a relatively poor cycling performance of the lithium ion battery.

SUMMARY

What is needed therefore is to provide a method for making a cathode active material coating liquid, and a method for coating the cathode active material.

One aspect of the present disclosure includes a method for making a cathode active material coating liquid, the method comprising:

S1, forming a phosphate ester solution by adding a phosphate ester in an alcoholic solvent;
S2, introducing an aluminum nitrate in the phosphate ester solution, wherein the aluminum nitrate is soluble to the alcoholic solvent, and the aluminum nitrate reacts with the phosphate ester to form a homogeneous clear solution;
S3, regulating a pH value of the homogeneous clear solution to a range from about 6 to about 7 by adding an acidity regulator to the homogeneous clear solution, the acidity regulator contains ammonium cation; and
S4, removing ammonium nitrate from the homogeneous clear solution after the regulating the pH value, thereby obtaining the cathode active material coating liquid.

Another aspect of the present disclosure includes a method for coating a cathode active material, the method comprising:

S1, forming a phosphate ester solution by adding a phosphate ester in an alcoholic solvent;
S2, introducing an aluminum nitrate in the phosphate ester solution, wherein the aluminum nitrate is soluble to the alcoholic solvent, and the aluminum nitrate reacts with the phosphate ester to form a homogeneous clear solution;
S3, regulating a pH value of the homogeneous clear solution to a range from about 6 to about 7 by adding an acidity regulator to the homogeneous clear solution, the acidity regulator contains ammonium cation;
S4, removing ammonium nitrate from the homogeneous clear solution after the regulating the pH value, thereby obtaining the cathode active material coating liquid;
S5, uniformly mixing the cathode active material with the cathode active material coating liquid to obtain a solid-liquid mixture; and
S6, drying and sintering the solid-liquid mixture to obtain a cathode composite material, wherein the cathode composite material comprises the cathode active material and a coating layer coated on a surface of the cathode active material.

Since the cathode active material coating liquid of the present disclosure is a homogeneous clear solution, it is easy to form a thin, uniform, and continuous coating layer on each cathode active material particle, and each cathode active material particle can be completely covered by the coating layer, thereby preventing side reactions between the cathode active material and an electrolyte liquid, and improving thermal stability and capacity retention of the lithium ion battery. In addition, since the thickness of the coating layer is small, the electrochemical performance of the lithium ion battery is not reduced. Besides, by adding the acidity regulator to regulate the cathode active material coating liquid from acidic to near neutral, a negative influence of the acidic solution to the cathode active material can be effectively reduced.

BRIEF DESCRIPTION OF THE DRAWINGS

Implementations are described by way of example only with reference to the attached figures.

DETAILED DESCRIPTION

A detailed description with the above drawings is made to further illustrate the present disclosure.

One embodiment of a cathode active material coating liquid is disclosed, and the cathode active material coating liquid includes a solvent and a coating precursor. The coating precursor is soluble to the solvent. The cathode active material coating liquid can be a homogeneous clear solution. The coating precursor can be completely dissolved in the solvent. The solvent can at least include an alcoholic solvent, and can further include a second solvent that is miscible with the alcoholic solvent. A pH value of the coating liquid is in a range from about 6 to about 7. The cathode active material coating liquid does not contain ammonium nitrate.

In one embodiment, the solvent in the cathode active material coating liquid can consist of an organic solvent, such as the alcoholic solvent. In another embodiment, the solvent in the cathode active material coating liquid can be a combination of the organic solvent and water, such as a combination of the alcoholic solvent and water. In one embodiment, the water in the solvent comes only from crystal water of raw materials for synthesizing the coating precursor.

In one embodiment, the coating precursor can include at least one of a first coordination complex represented by the following general formula (I-I) and a second coordination complex represented by the following general formula (I-II):

(I-I)

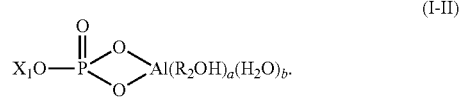

(I-II)

$R_1OH$ and $R_2OH$ are alcoholic solvent molecules and each can be independently selected from methanol, ethanol, propanol, n-butanol, isopropanol, or combinations thereof. x can be 1 to 5, y can be 0 to 4, and x+y=5. a can be 1 to 4, b can be 0 to 3, and a+b=4. Thus, each aluminum atom can be respectively coordinated with at least one alcoholic solvent molecule, and each aluminum atom can be respectively coordinated with at least one water molecule. $-OX_1$ and $-OX_2$ can be, each independently, $-OH$ or carbon-oxygen group corresponding to the alcoholic solvent molecule. In one embodiment, $-OX_1$ and $-OX_2$ can each be independently selected from $-OH$, methoxy, ethoxy, propoxy, butoxy, isopropoxy, or combinations thereof.

A mass percent of the coating precursor in the coating liquid can be in a range from about 1% to about 15%.

Figure 1:
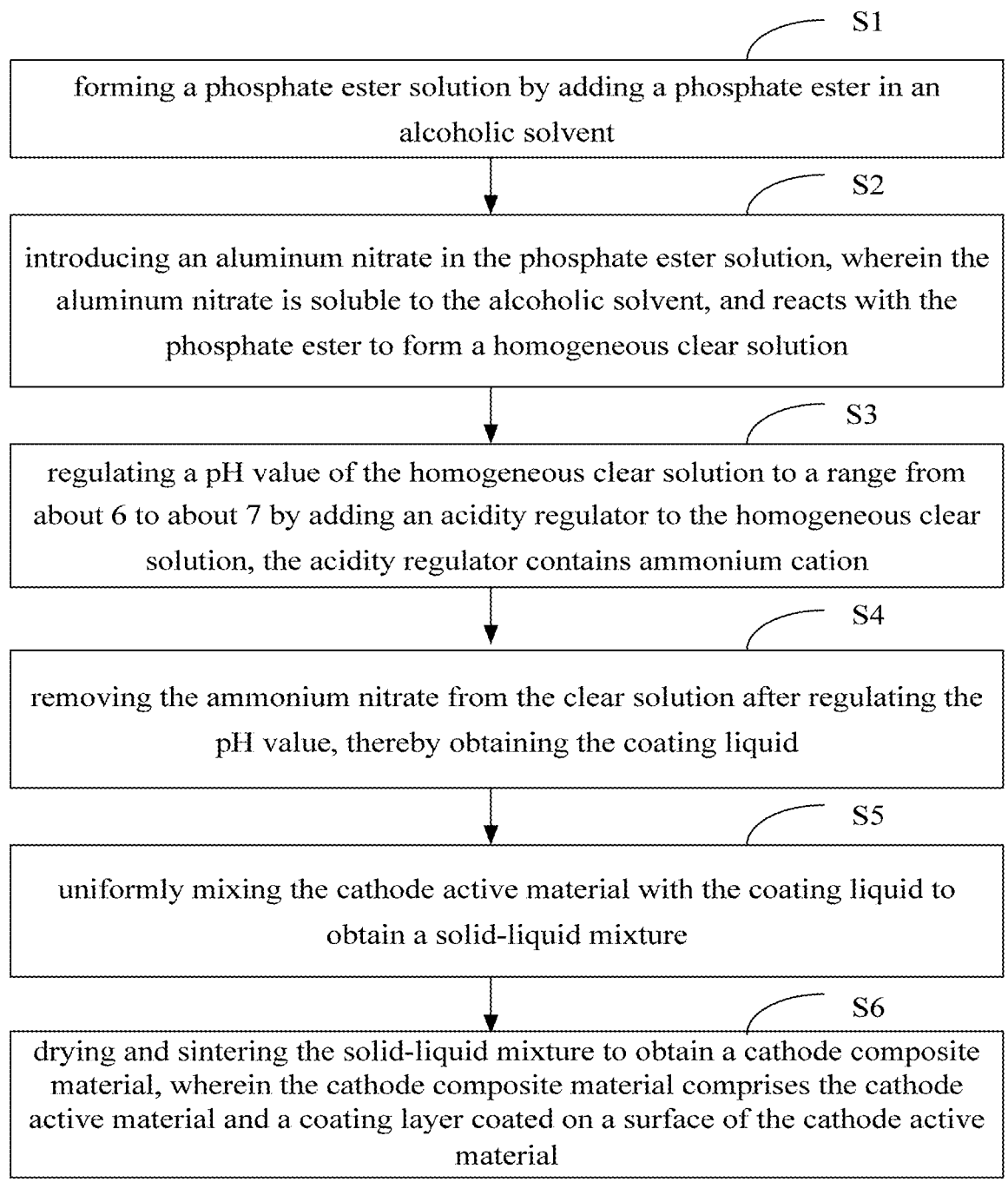
FIG. 1 is a flow chart of one embodiment of a method for making a cathode active material coating liquid and a method for coating a cathode active material.

Referring to FIG. 1, a first embodiment of a method for making the cathode active material coating liquid includes:

S1, forming a phosphate ester solution by adding a phosphate ester in an alcoholic solvent;

S2, introducing an aluminum nitrate in the phosphate ester solution, wherein the aluminum nitrate is soluble to the alcoholic solvent, and the aluminum nitrate reacts with the phosphate ester to form a homogeneous clear solution;

S3, regulating a pH value of the homogeneous clear solution to a range from about 6 to about 7 by adding an acidity regulator to the homogeneous clear solution, the acidity regulator contains ammonium cation; and S4, removing ammonium nitrate from the homogeneous clear solution after the regulating the pH value, thereby obtaining the cathode active material coating liquid.

The alcoholic solvent can be selected from methanol, ethanol, propanol, n-butanol, isopropanol, or combinations thereof.

The phosphate ester can have a general formula of $A_nP(O)(OH)_m$, wherein A can be an carbon-oxygen group corresponding to the alcoholic solvent molecule. In one embodiment, A can be selected from methoxy, ethoxy, propoxy, butoxy, isopropoxy, or combinations thereof. n can be 1 to 3, m can be 0 to 2, and m+n=3. In one embodiment, the phosphate ester can be selected from monomethyl phosphate, dimethyl phosphate, trimethyl phosphate, monoethyl phosphate, diethyl phosphate, triethyl phosphate, monobutyl phosphate, dibutyl phosphate, tributyl phosphate, monoisopropyl phosphate, di-isopropyl phosphate, tri-isopropyl phosphate, or combinations thereof.

A mass ratio of the phosphate ester to the alcoholic solvent can be in a range from about 1:1 to about 1:50.

S1 can further include forming the phosphate ester by adding at least one of phosphoric acid and phosphorus pentoxide ($P_2O_5$) into the alcoholic solvent to react the at least one of phosphoric acid and phosphorus pentoxide with the alcoholic solvent at a temperature in a range from about 0° C. to about 80° C. The amount of the alcoholic solvent can be excessive so that the at least one of phosphoric acid and phosphorus pentoxide can be completely reacted. In one embodiment, a mass ratio of the phosphoric acid and/or phosphorus pentoxide to the alcoholic solvent can be in a range from about 1:1 to about 1:50.

In one embodiment, the phosphorus pentoxide can react with ethanol as in the following reaction equation (II-I) and reaction equation (II-II):

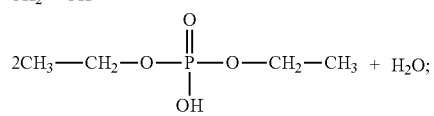
(II-I)

(II-II)

-continued

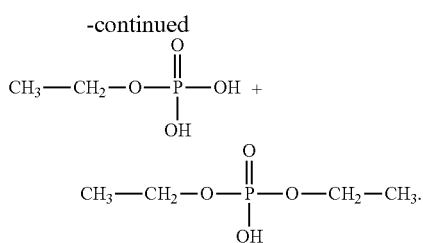

The aluminum nitrate can be an alcohol-soluble aluminum salt and aluminum ions can be dissociated in the alcoholic solvent. A mass ratio of the aluminum nitrate to the alcoholic solvent can be in a range from about 1:1 to about 1:50. A molar ratio of phosphorus element in the phosphate ester to aluminum element in the aluminum nitrate (P:Al) can be about 1:1. The aluminum nitrate may or may not have crystal water. In the embodiment, the alcohol-soluble aluminum salt contains only the aluminum nitrate.

In the reaction in S2 between the aluminum nitrate and the phosphate ester in the alcoholic solvent, aluminum ions are reacted with hydroxyl group of the phosphate ester to form a P—O—Al structure, and the aluminum ions are coordinated with the molecule of the alcoholic solvent due to ionic salvation to form a coordination complex. In one embodiment, a reaction temperature in S2 can be in a range from about 20° C. to about 80° C. A reaction time in S2 can be in a range from about 30 minutes to about 10 hours. When m in the general formula of $A_nP(O)(OH)_m$ is 0 (i.e., m=0), that is the phosphate ester has three ester groups, the phosphate ester can be hydrolyzed by the crystal water contained in the aluminum nitrate to generate the hydroxyl group, so that the above described reaction can be proceed.

In one embodiment, S2 includes:

S21, adding the aluminum nitrate in another alcoholic solvent and stirring till the aluminum salt is dissolved to obtain an aluminum nitrate solution; and S22, mixing the aluminum nitrate solution with the phosphate ester solution obtained in S1 to react the aluminum nitrate with the phosphate ester to form the homogeneous clear solution.

In one embodiment, the phosphate ester solution can react with the aluminum nitrate solution as in the following reaction equation (II-III) and reaction equation (II-IV):

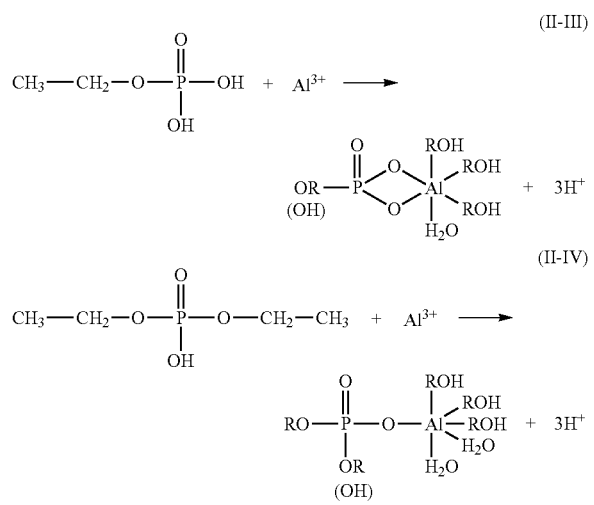

Since water has negative effects on the performance of certain cathode active materials, such as high nickel content ternary cathode active materials and a lithium cobalt oxide, some embodiments of the coating liquid does not contain water, or the water contained in the coating liquid comes only from crystal water of the raw material such as the aluminum nitrate. In one embodiment, none of the phosphate ester solution, the aluminum nitrate solution, and the homogeneous clear solution contains water, and the solvent is only an organic solvent. In another embodiment, the solvent in the phosphate ester solution, the mixture solution, and the homogeneous clear solution contains water only from the crystal water of the aluminum nitrate. In addition, the non-aqueous coating liquid can have a smaller viscosity and a smaller surface tension, so that the coating layer on a surface of the cathode active material can be more uniform.

In another embodiment, a modifying element containing compound can be further added into the phosphate ester solution, wherein the modifying element containing compound is soluble to the alcoholic solvent, and the modifying element containing compound reacts with the phosphate ester to form the homogeneous clear solution. The modifying element containing compound can be an alcohol-soluble compound, and ions of the modifying element M can be dissociated in the alcoholic solvent. The modifying element M can be selected from one or more of alkaline earth metal elements and transition metal elements. In one embodiment, the modifying element M can be selected from trivalent Cr, trivalent Fe, bivalent Sn, bivalent Ni, bivalent Co, bivalent Cu, bivalent Mn, tetravalent Zr, tetravalent Ti, or combinations thereof. The alcohol-soluble modifying element containing compound can be selected from magnesium nitrate, nickel nitrate, manganese nitrate, cobalt nitrate, magnesium acetate, nickel acetate, cobalt acetate, manganese acetate, zinc chloride, copper nitrate, tetrabutyl zirconate, tetrabutyl titanate, or combinations thereof. In one embodiment, the alcohol-soluble modifying element containing compound can be nitrate salt, such as magnesium nitrate, nickel nitrate, manganese nitrate, cobalt nitrate, copper nitrate, or combinations thereof. A molar ratio of the modifying element containing compound to the alcohol-soluble aluminum salt can be in a range from about 10:1 to about 1:10. The modifying element containing compound can be added in the phosphate ester solution together with the aluminum nitrate. A molar ratio of P in the phosphate ester to a total of Al in the aluminum nitrate and M in the modifying element containing compound, i.e., P:(Al+M), can be in a range from about 4:3 to about 2:3. The modifying element containing compound may or may not have crystal water.

In the reaction in S2 between the modifying element containing compound and the phosphate ester in the alcoholic solvent, ions of the modifying element are reacted with hydroxyl group of the phosphate ester to form a P—O-M structure, and the ions of the modifying element are coordinated with the molecule of the alcoholic solvent due to ionic salvation. When m in the general formula $A_nP(O)(OH)_m$ of the phosphate ester is 0, that is the phosphate ester has three ester groups, the phosphate ester can be hydrolyzed by the crystal water contained in the aluminum nitrate and/or the modifying element containing compound to generate the hydroxyl group, so that the above described reaction can be proceed.

In one embodiment, S2 includes:

S21, adding the aluminum nitrate and the modifying element containing compound in another alcoholic solvent, thereby obtaining a mixture solution containing the aluminum nitrate and the modifying element containing compound; and S22, mixing the mixture solution with the phosphate ester solution obtained in S1 to react the aluminum nitrate and the modifying element containing compound with the phosphate ester to form the homogeneous clear solution.

The phosphate ester solution can react with the ions of the modifying element M in the mixture solution, and reaction equations are respectively substantially same as the equation (II-III) and equation (II-IV), except that Al is substitute by M. In one embodiment, none of the phosphate ester solution, the mixture solution, and the homogeneous clear solution contains water, and the solvent is only an organic solvent. In another embodiment, the solvent in the phosphate ester solution, the mixture solution, and the homogeneous clear solution contains water only from the crystal water of the aluminum nitrate and/or the modifying element containing compound.

In one embodiment of S3, the acidity regulator can be ammonia water, ammonium bicarbonate, ammonium carbonate, ammonium acetate, or combinations thereof. A total amount of the acidity regulator that is added can be in accordance with the amount of the aluminum nitrate to have a molar ratio of the nitrogen element contained in the acidity regulator to the aluminum element contained in the aluminum nitrate (N:Al) being in a range from about 1:1 to about 6:1.

More specifically, S3 can include:

weighing the acidity regulator according to the stoichiometric ratio; and adding the acidity regulator to the homogeneous clear solution portion by portion, during which the homogeneous clear solution is continuously stirred to disperse the acidity regulator till all weighted acidity regulator is added into the homogeneous clear solution.

It should be understood than the amount of the acidity regulator should not be excessive in order to prevent the homogeneous clear solution from being alkaline. The coating precursor easily decomposes to form precipitate in an alkaline environment which makes the coating liquid unstable and not clear. By adding the acidity regulator to the homogeneous clear solution portion by portion, and stirring the homogeneous clear solution continuously, a regional excess of the acidity regulator can be avoided.

Figure 2:
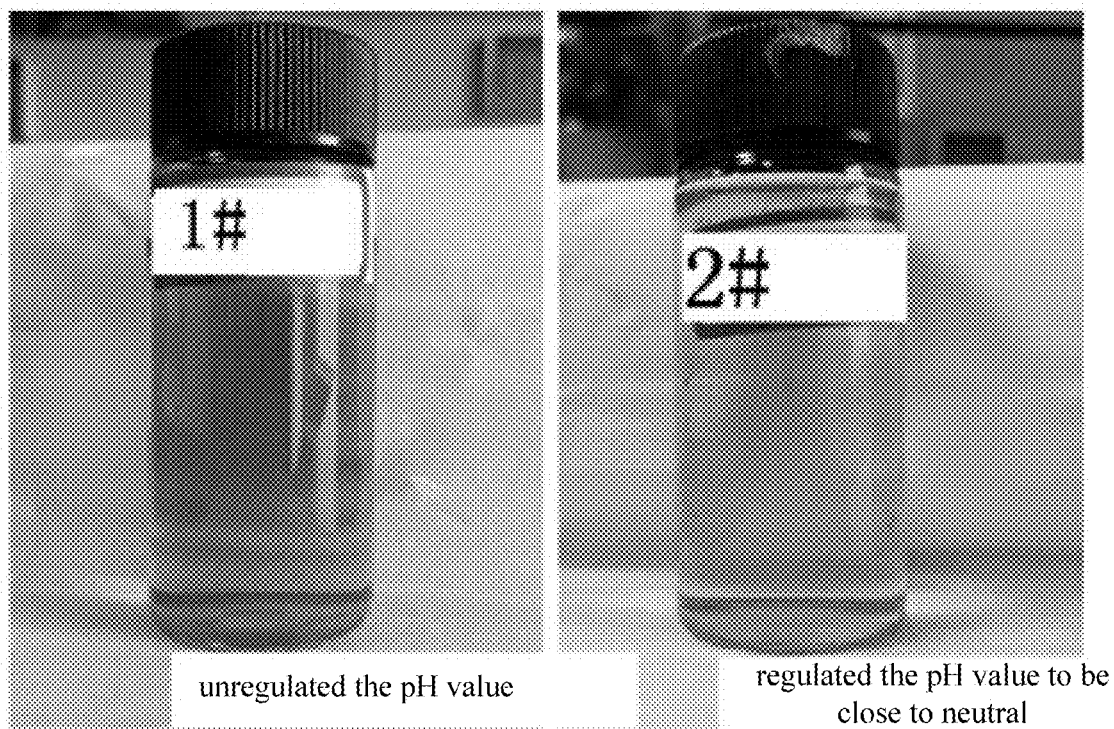
FIG. 2 is a graph showing a comparison between the cathode active material coating liquid having an acidity regulator and the cathode active material coating liquid without the acidity regulator, both of the coating liquids having the cathode active material immersed therein for a period of time.

Too strong an acidity of the coating liquid may lead to dissolution of active components in some cathode active materials, thereby deteriorating the performance and destroying structural stability of the cathode active material. Referring to FIG. 2, the coating liquid with the acidity regulator and the coating liquid without the acidity regulator are compared after the cathode active material is immersed in both coating liquids for a period of time, 1# is the coating liquid without the acidity regulator to regulate the PH value, and 2# is the coating liquid with the acidity regulator regulating the PH value to be close to neutral. It can be seen that the 1# coating liquid is dark and reddish, indicating that more active metal ions are dissolved from the cathode active material. And 2# coating liquid is colorless, indicating that less active metal ions are dissolved from the cathode active material. The coating liquid in step S3 is still a clear solution when the acidity thereof is adjusted to about neutrality, and no precipitation occurs.

In one embodiment, S4 can include:

concentrating and cooling the pH value regulated homogeneous clear solution to remove the ammonium nitrate.

Specifically, the removing the ammonium nitrate from the homogeneous clear solution can include:

distilling the homogeneous clear solution under a reduced pressure to concentrate the homogeneous clear solution to 1/10 to 1/5 of an original volume thereof;

cooling the concentrated solution to crystallize and precipitate the ammonium nitrate solid; and filtering the ammonium nitrate solid to remove the ammonium nitrate from the homogeneous clear solution.

In one embodiment, the pH value regulated homogeneous clear solution is distilled and stirred in vacuum at about 30° C. to about 60° C., and the cooling temperature can be in a range from about −10° C. to about 20° C.

Aluminum nitrate is used as an aluminum source and reacted with the acidity regulator containing ammonium cation to form the ammonium nitrate. By removing the ammonium nitrate from the coating liquid, the performance of the coating liquid can be improved in two aspects. One is that it can avoid a precipitation of ammonium nitrate crystals on the surface of the cathode electrode active material during a drying step after coating the cathode active material with the coating liquid, thereby avoiding a decreasing of continuity and uniformity of the coating layer. The other is that it can avoid a contamination to the circumstance due to a decomposition of the ammonium nitrate into nitrogen oxides ($NO_x$) during a sintering step after coating the cathode active material with the coating liquid.

One embodiment of a method for coating the cathode active material by using the coating liquid includes:

S5, uniformly mixing the cathode active material with the cathode active material coating liquid to obtain a solid-liquid mixture; and S6, drying and sintering the solid-liquid mixture to obtain a cathode composite material, wherein the cathode composite material comprises the cathode active material and a coating layer coated on a surface of the cathode active material.

Figure 3:
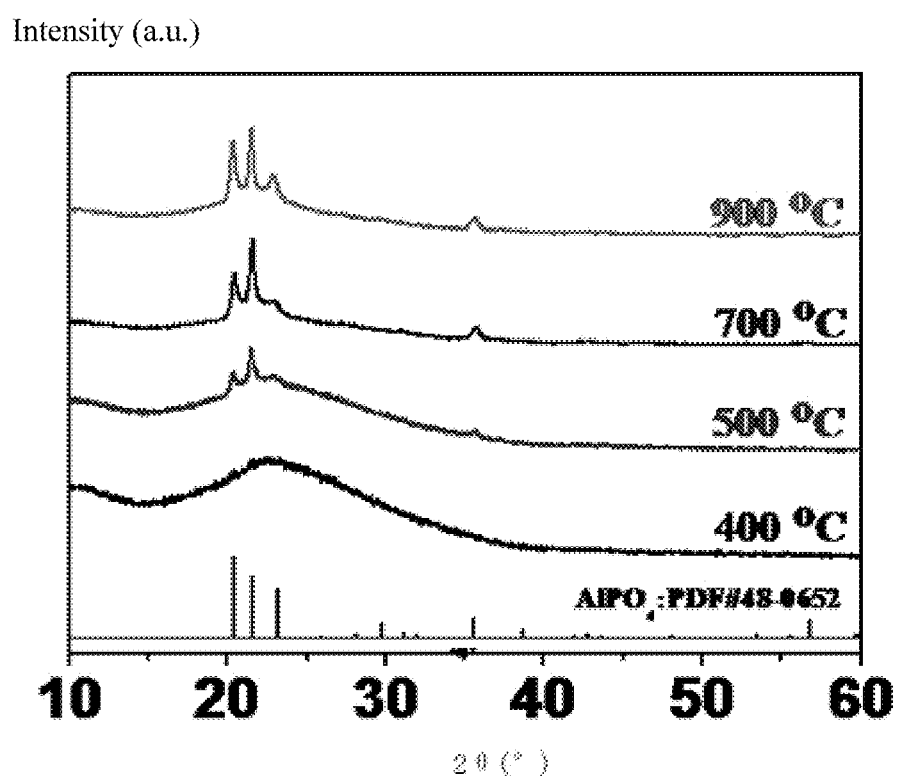
FIG. 3 is a graph showing X-ray diffraction ("XRD") spectrums of embodiments of coating layers obtained by sintering at different temperatures.

Referring to FIG. 3, in one embodiment, products are obtained by drying and sintering the coating liquid at different temperatures (400° C., 500° C., 700° C., 900° C.). The XRD spectrum of the products shown in FIG. 3 proves that the chemical composition of the coating layer is $AlPO_4$.

A mass percent of the coating layer in the cathode composite material can be in a range from about 0.3% to about 5%. A thickness of the coating layer can be in a range from about 5 nm to about 100 nm.

The cathode active material can be at least one of layer type lithium transition metal oxides, spinel type lithium transition metal oxides, and olivine type lithium transition metal oxides, such as olivine type lithium iron phosphate, layer type lithium cobalt oxide, layer type lithium manganese oxide, spinel type lithium manganese oxide, lithium nickel manganese oxide, and lithium cobalt nickel manganese oxide.

In S5, a liquid thin film of the coating liquid can be formed on the surface of the cathode active material. In one embodiment, the cathode active material and the coating liquid are mixed uniformly and then filtered to create the solid-liquid mixture in a slurry state in which most of the coating liquid is coated on the surface of the cathode active material, which is beneficial to obtain the cathode composite material with a relatively thin coating layer coated on the surface of the cathode active material.

In S6, the solid-liquid mixture can be naturally dried at room temperature or heated, such as at about 60° C. to about 100° C., as long as the solvent of the solid-liquid mixture can be removed. The sintering can be performed in air, so that organic groups in the coating precursor can be removed to form the coating layer. A sintering temperature can be in a range from about 300° C. to about 800° C., such as 400° C. A sintering time can be in a range from about 3 hours to about 8 hours.

Since the cathode active material coating liquid of the present disclosure is a homogeneous clear solution, it is easy to form the thin, uniform, and continuous coating layer on each cathode active material particle, and each cathode active material particle can be completely covered by the coating layer, thereby preventing side reactions between the cathode active material and the electrolyte liquid, and improving the thermal stability and capacity retention performance of the lithium ion battery. In addition, the since the thickness of the coating layer is small, electrochemical performance of the lithium ion battery is not reduced. Furthermore, by regulating the coating liquid to be close to neutral, the negative influence of the acidic solution to the cathode active material can be effectively reduced.

Example 1

Phosphorus pentoxide and ethanol are mixed in a molar ratio of 1:10 and stirred at room temperature to obtain a phosphate ester solution, during which phosphorus pentoxide is completely transformed into phosphate ester. Aluminum nitrate and ethanol are mixed in a molar ratio of 1:10, and the aluminum nitrate is completely dissolved to form an aluminum nitrate solution, wherein a mole ratio of P to Al is about 1:1. The phosphate ester solution and the aluminum nitrate solution are mixed and stirred at 50° C. to obtain a homogeneous clear solution. The ammonium bicarbonate is added to the homogeneous clear solution portion by portion, wherein a mole ratio of ammonium bicarbonate to Al is about 3:1, during which the homogeneous clear solution is continuously stirred to obtain a solution with a neutral pH value. Then the homogeneous clear solution under reduced pressure is distilled to concentrate the homogeneous clear solution to 1/5 of the original volume, and the concentrated solution is cooled to 0° C. to precipitate the ammonium nitrate solid. The ammonium nitrate solid is filtered out from the homogeneous clear solution to obtain the cathode active material coating liquid.

The coating liquid and the cathode active material $LiNi_{1/3}Co_{1/3}Mn_{1/3}O_2$ are mixed in a mass ratio of 1:5 to 1:2 to obtain a solid-liquid mixture. The solid-liquid mixture is filtered to remove redundant liquid, and sintered at 400° C. in air to obtain a cathode composite material. A lithium ion battery is assembled by using the cathode composite material. The electrolyte liquid of the lithium ion battery is 1.0 mol $L^{-1}$ of $LiPF_6$ (EC/EMC=3:7, mass ratio). The anode of the lithium ion battery is lithium metal. The charging and discharging performance of the lithium ion battery is tested.

Comparative Example 1

A lithium ion battery is assembled by using uncoated cathode active material $LiNi_{1/3}Co_{1/3}Mn_{1/3}O_2$. Other components of the lithium ion battery and test conditions of the charging and discharging performance are the same as that of Example 1.

Comparative Example 2

Comparative Example 2 is substantially the same as Example 1, except that acidity regulation and ammonium nitrate removal are not performed on the homogeneous clear solution obtained by S2.

A lithium ion battery is assembled by using the coated cathode active material $LiN_{1/3}Co_{1/3}Mn_{1/3}O_2$. Other components of the lithium ion battery and test conditions of the charging and discharging performance are the same as that of Example 1.

Figure 4:
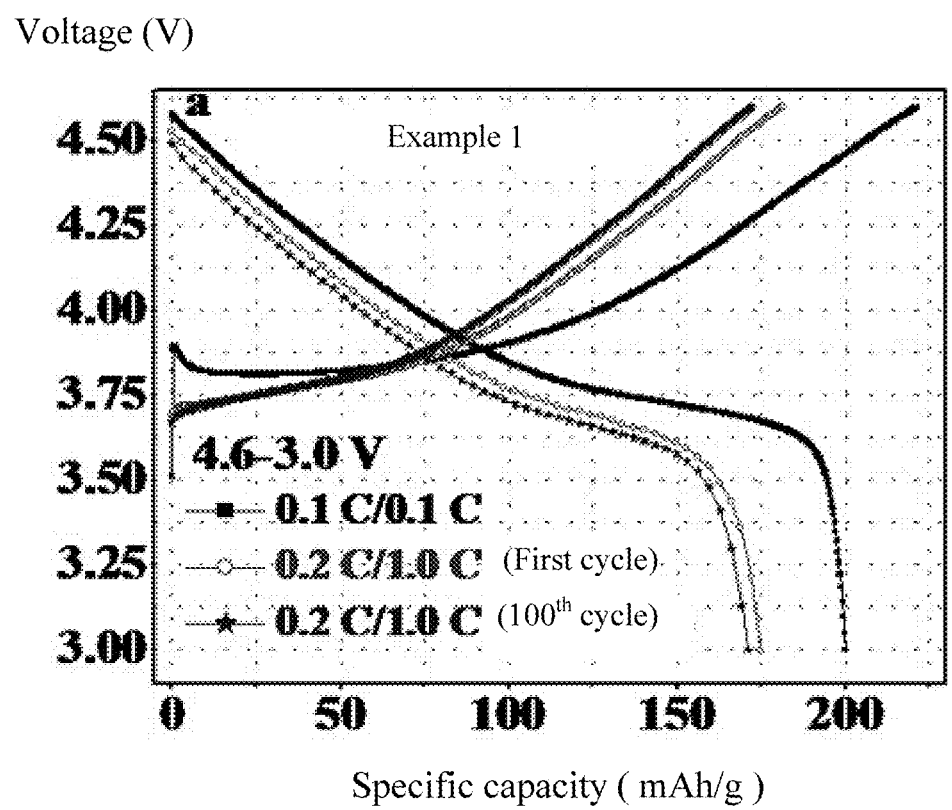
FIG. 4 is a graph showing charging and discharging voltage curves of one embodiment of a lithium ion battery using a coated cathode active material.

Referring to FIG. 4, the lithium ion battery of Example 1 is galvanostatically charged and discharged between 3.0 V and 4.6 V at different current densities that is the battery is charged at 0.1 C and then discharged at 0.1 C, and charged at 0.5 C and then discharged at 0.5 C. It can be seen from FIG. 4 that the lithium ion battery discharged at high current density still has a high specific capacity, and has a relatively small capacity loss after 100 cycles showing an excellent capacity retention.

Figure 5:
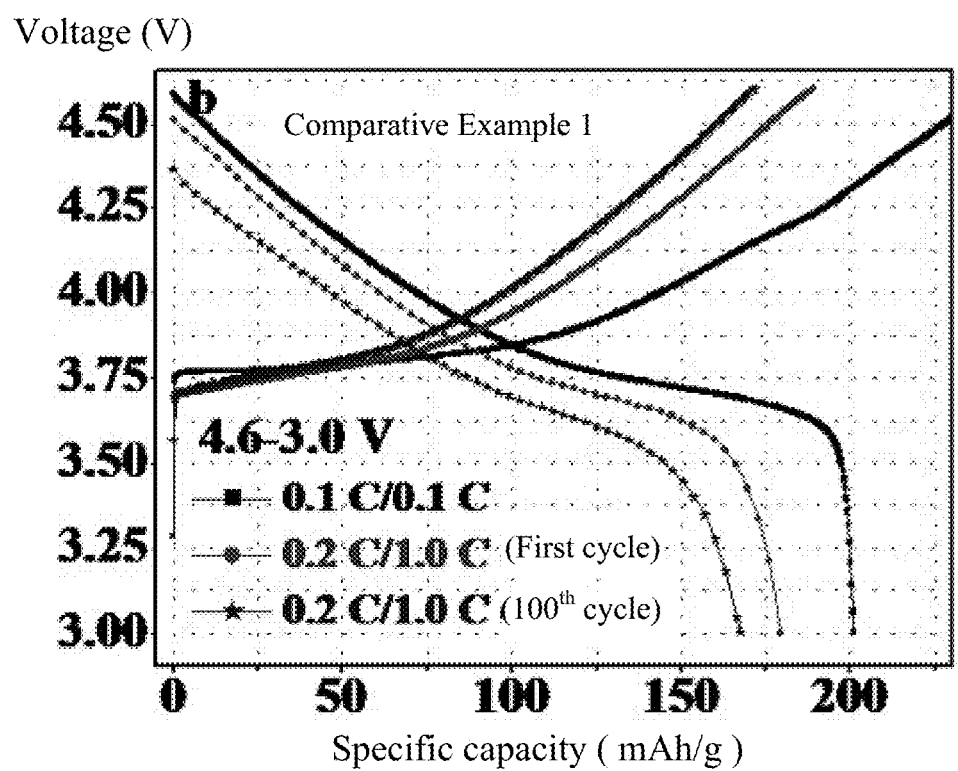
FIG. 5 is a graph showing charging and discharging voltage curves of a lithium ion battery using an uncoated cathode active material.
Figure 6:
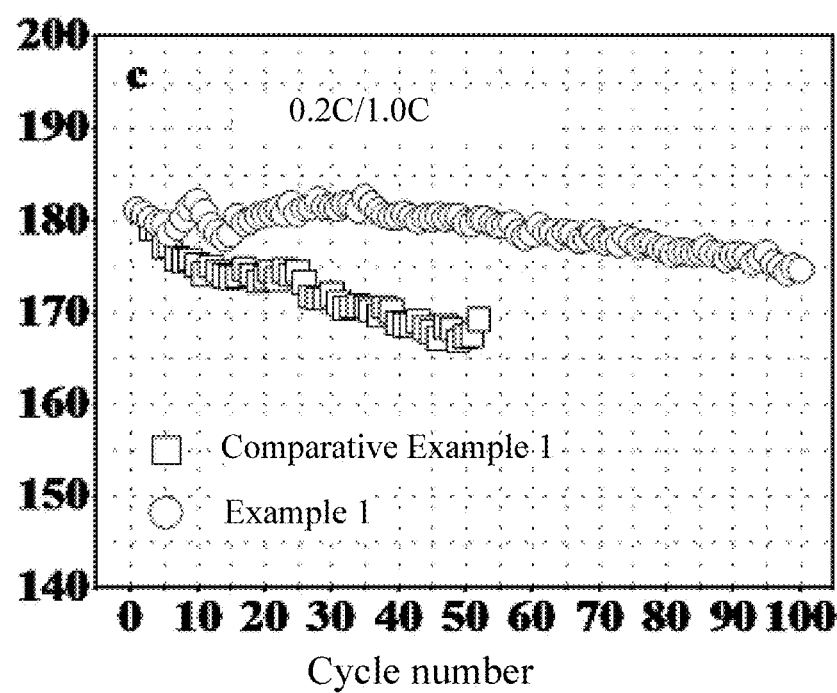
FIG. 6 is a graph showing a comparison between cycling performances of the lithium ion batteries using the coated cathode active material and uncoated cathode active material.

Referring to FIG. 5 and FIG. 6, the lithium ion battery of Comparative Example 1 is galvanostatically charged and discharged at the same condition with the lithium ion battery of Example 1. It can be seen that the discharge specific capacity of the lithium ion battery significantly decreases after the battery is charged and discharged at high discharge current density over 50 cycles, showing a poor capacity retention of the battery. It can be concluded that the coating layer on the cathode active material can significantly improve the capacity retention of the cathode active material and greatly improve the electrochemical performance of the lithium ion battery.

Figure 7:
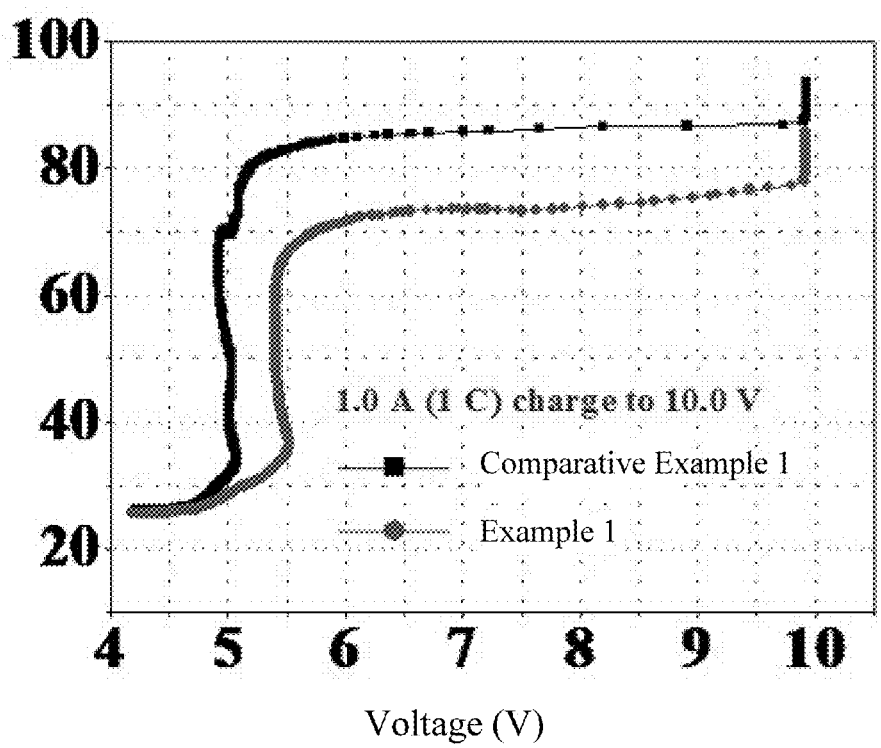
FIG. 7 is a graph showing temperature-voltage curves of the lithium ion batteries using the coated cathode active material and uncoated cathode active material.

Referring to FIG. 7, the lithium ion batteries of Example 1 and Comparative Example 1 are overcharged. More specifically, the lithium ion batteries are respectively charged at a current of 1.0 A till the voltage reaches 10.0 V, during which temperatures of the lithium ion batteries are measured. It can be seen that the temperature of the lithium ion battery in Example 1 is lower than that of Comparative Example 1.

Figure 8:
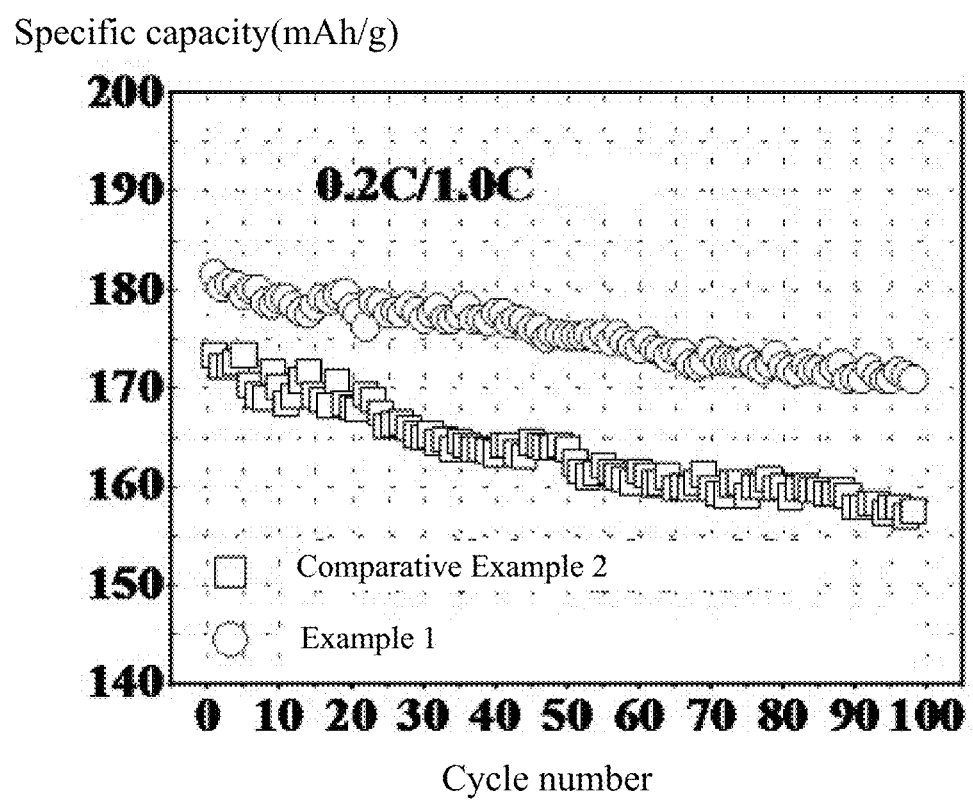
FIG. 8 is a graph showing a comparison between cycling performances of the lithium ion batteries using the cathode active material coating liquid having the acidity regulator and the cathode active material coating liquid without the acidity regulator.

Referring to FIG. 8, the lithium ion battery of Example 1 and Comparative Example 2 are galvanostatically charged and discharged between 3.0 V and 4.6 V at specific current densities that is the battery is charged at 0.2 C and then discharged at 1.0 C. It can be seen from FIG. 8 that compared with using the coating liquid with the unregulated pH value, the cathode active material using the coating liquid with the regulated pH value that is close to neutral has a better battery capacity. In addition, both of the batteries form a coating layer, and show an excellent capacity retention.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a cathode active material coating liquid, the method comprising:
   forming a phosphate ester solution by adding a phosphate ester in an alcoholic solvent;
   introducing an aluminum nitrate in the phosphate ester solution, wherein the aluminum nitrate is soluble to the alcoholic solvent, and the aluminum nitrate reacts with the phosphate ester to form a homogeneous clear solution;
   regulating a pH value of the homogeneous clear solution to a range from about 6 to about 7 by adding an acidity regulator to the homogeneous clear solution, the acidity regulator containing ammonium cation; and removing ammonium nitrate from the homogeneous clear solution after the regulating the pH value.

2. The method of claim 1, wherein the removing the ammonium nitrate from the homogeneous clear solution comprises concentrating and cooling the homogeneous clear solution to remove the ammonium nitrate.

3. The method of claim 1, wherein the removing the ammonium nitrate from the homogeneous clear solution comprises:

distilling the homogeneous clear solution under a reduced pressure to concentrate the homogeneous clear solution to 1/10 to 1/5 of an original volume of the homogeneous clear solution;

cooling the homogeneous clear solution to crystallize and precipitate ammonium nitrate solid; and filtering the ammonium nitrate solid to remove the ammonium nitrate from the homogeneous clear solution.

4. The method of claim 3, wherein the distilling the homogeneous clear solution under the reduced pressure comprises:

stirring and distilling the homogeneous clear solution in vacuum at about 30° C. to about 60° C.

5. The method of claim 3, wherein the cooling the homogeneous clear solution comprises:

cooling the homogeneous clear solution to a temperature in a range from about −10° C. to about 20° C.

6. The method of claim 1, wherein the alcoholic solvent is selected from the group consisting of methanol, ethanol, propanol, n-butanol, isopropanol, and combinations thereof.

7. The method of claim 1, wherein the phosphate ester is selected the group consisting of methyl phosphate, dimethyl phosphate, trimethyl phosphate, ethyl phosphate, diethyl phosphate, triethyl phosphate, butyl phosphate, dibutyl phosphate, tributyl phosphate, isopropyl phosphate, di-isopropyl phosphate, tri-isopropyl phosphate, and combinations thereof.

8. The method of claim 1, wherein a molar ratio of P in the phosphate ester to Al in the aluminum nitrate is 1:1.

9. The method of claim 1, wherein the introducing the aluminum nitrate in the phosphate ester solution comprises:

adding the aluminum nitrate in another alcoholic solvent and stirring till the aluminum salt is dissolved to obtain an aluminum nitrate solution; and mixing the aluminum nitrate solution with the phosphate ester solution to react the aluminum nitrate with the phosphate ester to form the homogeneous clear solution.

10. The method of claim 1, wherein the acidity regulator is selected from the group consisting of ammonia water, ammonium bicarbonate, ammonium carbonate, ammonium acetate, and combinations thereof.

11. The method of claim 1, wherein a total amount of the acidity regulator is in accordance with an amount of the aluminum nitrate to have a molar ratio of N contained in the acidity regulator to Al contained in the aluminum nitrate being in a range from about 1:1 to about 6:1.

12. The method of claim 1, wherein the phosphate ester is formed by adding at least one of phosphoric acid and phosphorus pentoxide into the alcoholic solvent to react the at least one of phosphoric acid and phosphorus pentoxide with the alcoholic solvent at a temperature in a range from about 0° C. to about 80° C.

13. The method of claim 1, wherein the homogeneous clear solution comprises a coordination complex comprising a P—O—Al structure.

14. The method of claim 1 further comprising introducing a modifying element containing compound in the phosphate ester solution, wherein the modifying element containing compound is soluble to the alcoholic solvent, and the modifying element containing compound reacts with the phosphate ester to form the homogeneous clear solution.

15. The method of claim 14, wherein the modifying element is selected from the group consisting of trivalent Cr, trivalent Fe, bivalent Sn, bivalent Ni, bivalent Co, bivalent Cu, bivalent Mn, tetravalent Zr, tetravalent Ti, and combinations thereof.

16. The method of claim 14, wherein the modifying element is selected from the group consisting of alkaline earth metal elements, transition metal elements, and combinations thereof.

17. A method for coating a cathode active material, the method comprising:

forming a phosphate ester solution by adding a phosphate ester in an alcoholic solvent;

introducing an aluminum nitrate in the phosphate ester solution, wherein the aluminum nitrate is soluble to the alcoholic solvent, and the aluminum nitrate reacts with the phosphate ester to form a homogeneous clear solution;

regulating a pH value of the homogeneous clear solution to a range from about 6 to about 7 by adding an acidity regulator to the homogeneous clear solution, the acidity regulator containing ammonium cation;

removing ammonium nitrate from the homogeneous clear solution after the regulating the pH value, thereby obtaining a coating liquid;

uniformly mixing the cathode active material with the coating liquid to obtain a solid-liquid mixture; and drying and sintering the solid-liquid mixture to obtain a cathode composite material, wherein the cathode composite material comprises the cathode active material and a coating layer coated on a surface of the cathode active material.

\* \* \* \* \*